(12) United States Patent
Chiang et al.

(10) Patent No.: US 7,696,983 B2
(45) Date of Patent: Apr. 13, 2010

(54) WIRELESS MOUSE HAVING A POWER SWITCH WITH DUAL ENGAGEMENT MODES

(75) Inventors: Hsiao-Lung Chiang, Taipei (TW); Hong-Che Yen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 742 days.

(21) Appl. No.: 11/470,735

(22) Filed: Sep. 7, 2006

(65) Prior Publication Data

US 2008/0007523 A1 Jan. 10, 2008

(30) Foreign Application Priority Data

Jul. 7, 2006 (TW) ............................... 95124760 A

(51) Int. Cl.
*G06F 3/033* (2006.01)
(52) U.S. Cl. ...................................... 345/163; 345/166
(58) Field of Classification Search ................. 345/157, 345/163, 166
See application file for complete search history.

(56) References Cited

U.S. PATENT DOCUMENTS 5,943,625 A * 8/1999 Yeom et al. .................. 455/557

| | | | |
|---|---|---|---|
| 2003/0179177 A1 * | 9/2003 | Wang | 345/156 |
| 2006/0244726 A1 * | 11/2006 | Wang et al. | 345/163 |
| 2006/0274043 A1 * | 12/2006 | Lu | 345/163 |
| 2007/0005844 A1 * | 1/2007 | Lee et al. | 710/62 |
| 2007/0115259 A1 * | 5/2007 | Pai | 345/163 |

* cited by examiner

*Primary Examiner*—Chanh Nguyen
*Assistant Examiner*—Kwang-Su Yang
(74) *Attorney, Agent, or Firm*—Kirton & McConkie; Evan R. Witt

(57) ABSTRACT

A wireless mouse includes a housing, a wireless signal receiver, a power switch, a carrier seat and a push-push element. The power switch is arranged inside the housing and includes a triggering part. The carrier seat is movably installed inside the housing for carrying the wireless signal receiver thereon and has a knob exposed outside a surface of the housing. The push-push element is arranged inside the housing and includes a clipping part for engaging with the carrier seat to fix the carrier seat in a first position or a second position. When the carrier seat is fixed in the first position, the carrier seat contacts the triggering part of the power switch to turn off the power switch.

5 Claims, 3 Drawing Sheets

WIRELESS MOUSE HAVING A POWER SWITCH WITH DUAL ENGAGEMENT MODES

FIELD OF THE INVENTION

The present invention relates to a wireless mouse, and more particularly to a wireless mouse having a power switch controlled by inserting or withdrawing a wireless signal receiver therein/therefrom or manually adjusting a knob exposed outside the housing thereof.

BACKGROUND OF THE INVENTION

Nowadays, wireless mice have experienced great growth and are rapidly gaining in popularity because no cables are required when they are operated. Since no power cable is communicated between the wireless mouse and the computer system, the wireless mouse fails to directly receive power from the computer system. In other words, during operation of the wireless mouse, the wireless mouse should have at least one built-in battery. As a consequence, it is an important issue to reduce power consumption of the wireless mouse.

Typically, the wireless mouse principally comprises two major parts, i.e. a mouse main body and a wireless signal receiver. The wireless signal receiver is electrically connected to the computer system, and thus the signals generated from the wireless mouse can be transmitted to the computer system via the wireless signal receiver. For power-saving purpose, the wireless mouse is powered off when it is not operated.

Conventionally, two approaches are used to selectively power on or power off the wireless mouse. In accordance with the first approach, a knob is protruded from a surface of the wireless mouse. By adjusting the knob to an "ON" position, the power switch of the wireless mouse is triggered so that the user can operate the wireless mouse. When the wireless mouse is not used, the knob can be adjusted to an "OFF" position to power off the wireless mouse. This approach is not feasible because the user may often forget to adjust the knob to the "OFF" position when the wireless mouse is not used.

In accordance with the second approach, the power switch of the wireless mouse is controlled through the wireless signal receiver. In a case that the wireless mouse is not used, the wireless signal receiver can be received in the storing portion of the wireless mouse. Under this circumstance, the power switch inside the wireless mouse is automatically powered off. Whereas, when the wireless signal receiver is withdrawn from the storing portion of the wireless mouse, the power switch of the wireless mouse is triggered and thus the wireless mouse is powered on.

The second approach still has some drawbacks. For example, even if the wireless mouse needs to be temporarily powered off, the wireless signal receiver needs to be detached from the connecting port of the computer and then inserted into the storing portion of the wireless mouse. That is, such an approach is not user-friendly and inconvenient.

In views of the above-described disadvantages resulted from the prior art, the applicant keeps on carving unflaggingly to develop a wireless mouse according to the present invention through wholehearted experience and research.

SUMMARY OF THE INVENTION

It is an object of the present invention to provide a wireless mouse having a power switch controlled by inserting or withdrawing a wireless signal receiver therein/therefrom or manually adjusting a knob exposed outside the housing thereof.

In accordance with an aspect of the present invention, there is provided a wireless mouse. The wireless mouse comprises a housing, a wireless signal receiver, a power switch, a carrier seat and a push-push element. The power switch is arranged inside the housing and includes a triggering part. The carrier seat is movably installed inside the housing for carrying the wireless signal receiver thereon and has a knob exposed outside a surface of the housing. The push-push element is arranged inside the housing and includes a clipping part for engaging with the carrier seat to fix the carrier seat in a first position or a second position. When the carrier seat is fixed in the first position, the carrier seat contacts the triggering part of the power switch to turn off the power switch.

In an embodiment, the clipping part of the push-push element has a recess structure therein.

In an embodiment, the carrier seat further comprises an engaging plate to be inserted into the recess structure of the clipping part.

Preferably, the knob and the engaging plate of the carrier seat are integrally formed.

In an embodiment, the housing further comprises an elongated channel and the knob is movable along the elongated channel.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
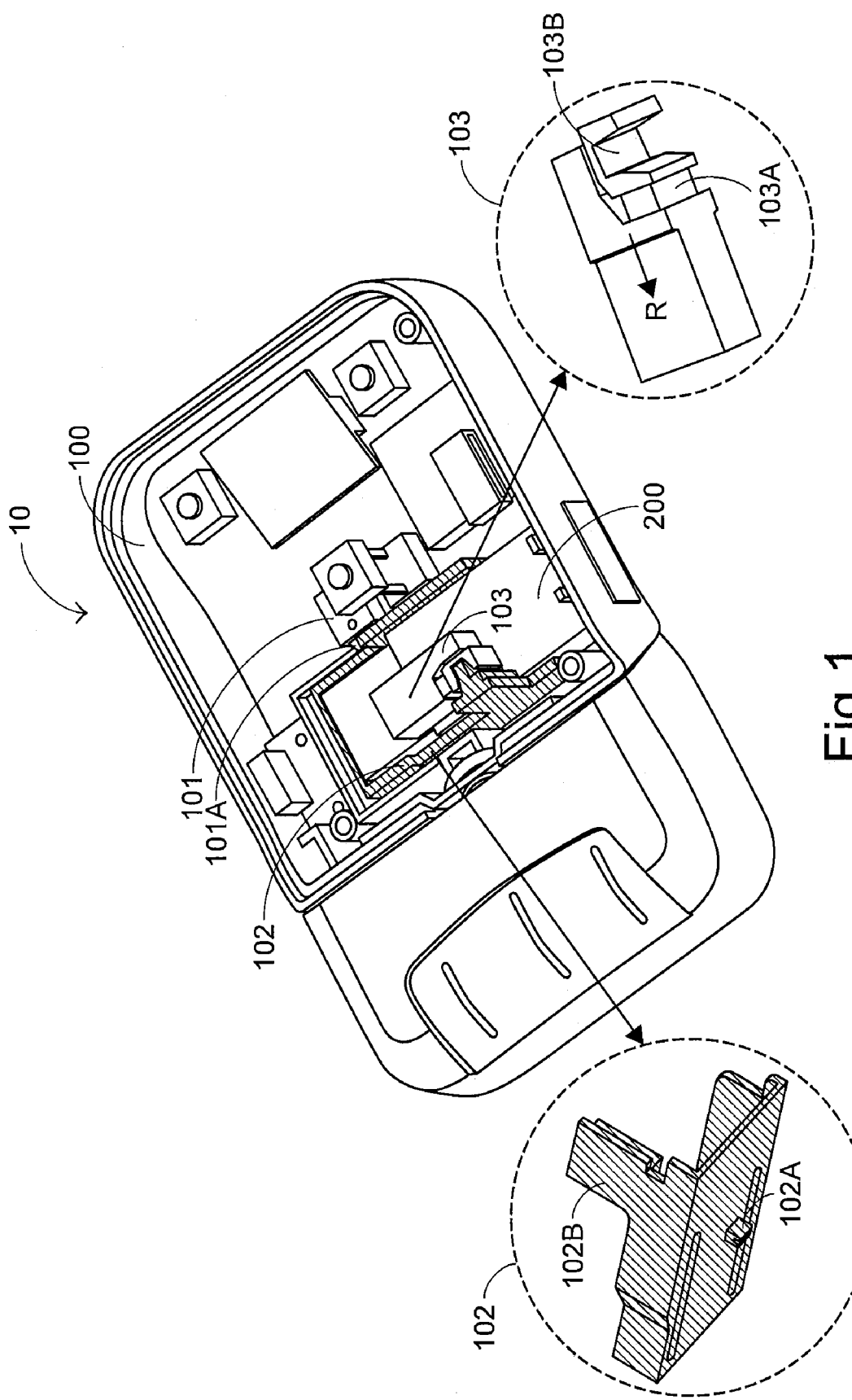
FIG. 1 is a schematic view illustrating a wireless mouse according to a preferred embodiment of the present invention, in which a wireless signal receiver is completely accommodated within the housing.

Referring to FIG. 1, a schematic view of a wireless mouse according to a preferred embodiment of the present invention is illustrated. The wireless mouse 10 of FIG. 2 comprises a housing 100 and a wireless signal receiver 200. The wireless mouse 10 further comprises a power switch 101 having a triggering part 101A, a carrier seat 102 and a push-push element 103.

In FIG. 1, partially enlarged views of the carrier seat 102 and the push-push element 103 are also illustrated. The push-push element 103 includes a clipping part 103A having a recess structure 103B therein. The carrier seat 102 includes a knob 102A and an engaging plate 102B. It is preferred that the knob 102A and an engaging plate 102B are integrally formed. Referring to FIG. 1 and also FIG. 3, the knob 102A is protruded from a surface of the housing 100 for facilitating movement between a first position and a second position by the user.

The wireless signal receiver 200 is carried on the carrier seat 102. The push-push element 103 is fixed onto an upper cover of the wireless mouse 10. For clarification, only the inner components are shown in the drawings but the upper cover is not shown herein. The engaging plate 102B is inserted into the recess structure 103B of the push-push element 103 such that the push-push element 103 is transmitted to move by the carrier seat 102.

In accordance with the feature of the push-push element 103, the clipping part 103A is moved to a first position in response to a pressing action applied thereon in the direction indicated by the arrow R, and the clipping part 103A is moved to a second position in response to a further pressing action applied thereon in the direction R.

Figure 2:
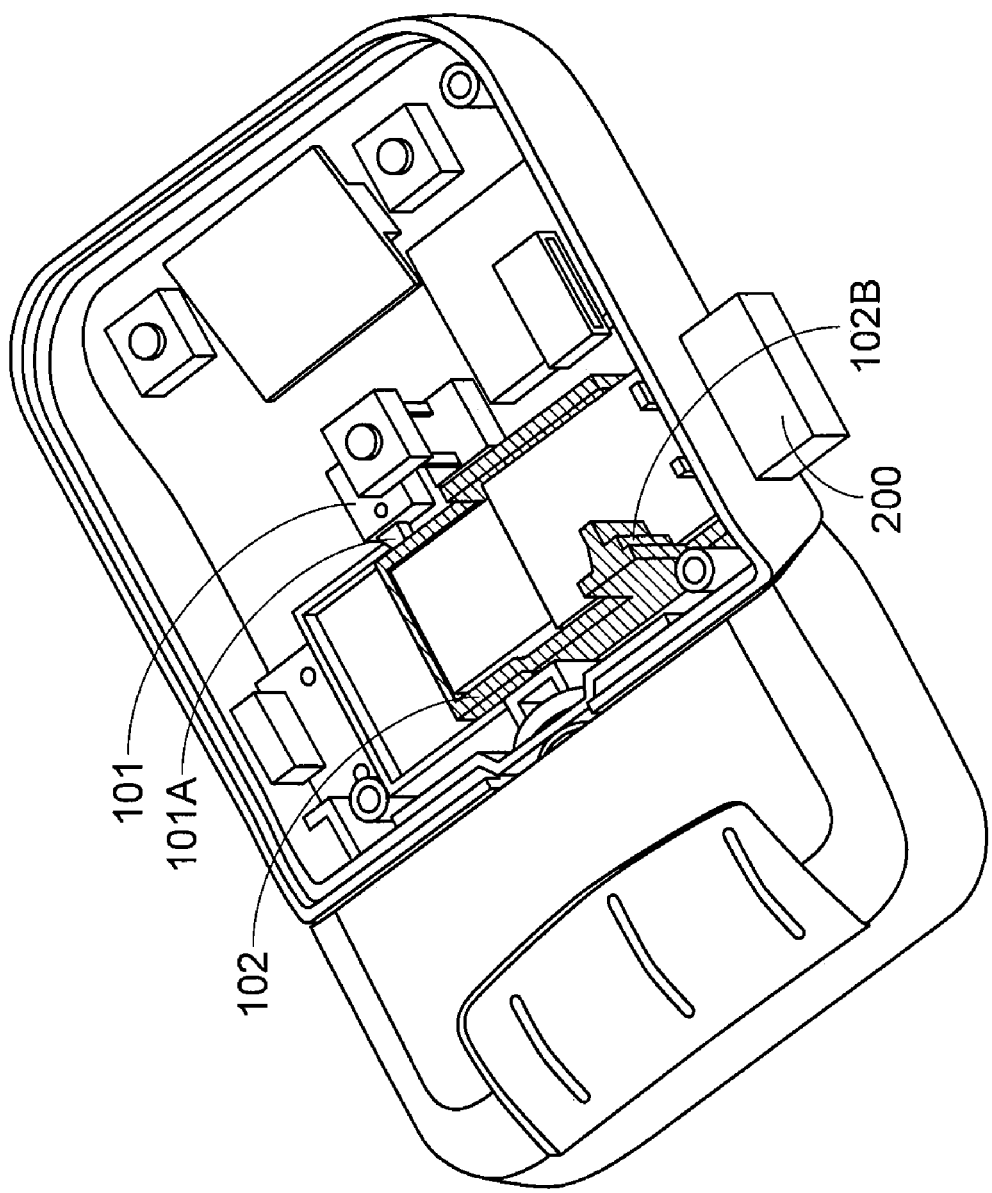
FIG. 2 is a schematic view of the wireless mouse of FIG. 1, in which the wireless signal receiver is withdrawn from the housing.

The operation principle of using the wireless signal receiver 200 to control the power switch 101 will be illustrated with reference to FIGS. 1 and 2. First of all, the wireless signal receiver 200 is penetrated through an entrance on a sidewall of the housing 100, and then inserted into the wireless mouse 10 and carried on the carrier seat 102. During the process of inserting the wireless signal receiver 200, the wireless signal receiver 200 is sustained against the carrier seat 102, and thus the carrier seat 102 is transmitted to move forwardly. Once the carrier seat 102 is sustained against the triggering part 101A of the power switch 101, the power supply of the wireless mouse 10 is interrupted. At the moment when the carrier seat 102 is moved forwardly, the push-push element 103 is transmitted to move in the direction R such that the carrier seat 102 is fixed at the first position. Under this circumstance, the wireless signal receiver 200 is completely stored within the housing 100 of the wireless mouse 10, as is shown in FIG. 1.

For a purpose of removing the wireless signal receiver 200, a pressing action is applied on the wireless signal receiver 200 in the direction R. In response to the pressing action, the carrier seat 102 is sustained against the clipping part 103A of the push-push element 103 so that the clipping part 103A is transmitted to move to the second position. Under this circumstance, a portion of the wireless signal receiver 200 is exposed outside the housing 100, as is shown in FIG. 2. For clarification, the push-push element 103 is not shown in this drawing. Since the carrier seat 102 is not in contact with the triggering part 101A of the power switch 101, the power switch 101 is turned on and the wireless mouse 10 is operated in the power-on state.

Figure 3B:
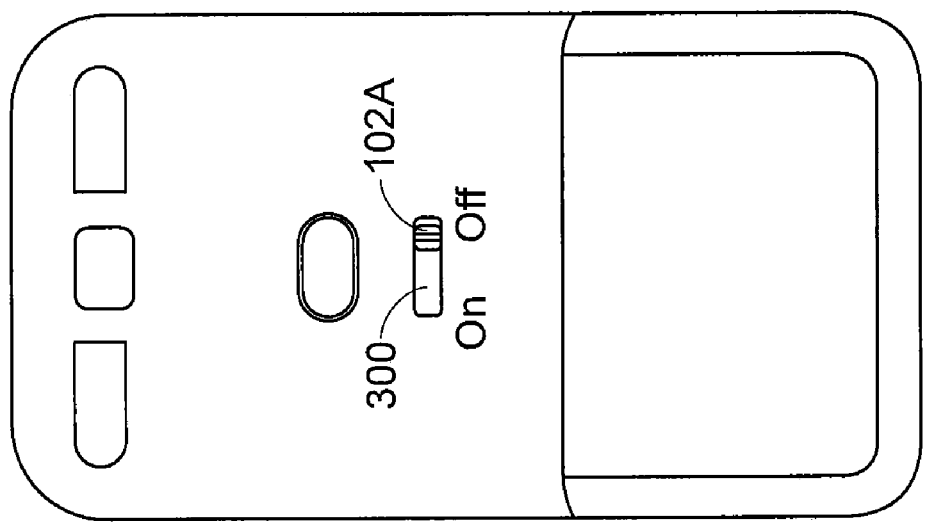
FIG. 3B is a schematic view illustrating the knob adjusted to an "OFF" position.
Figure 3A:
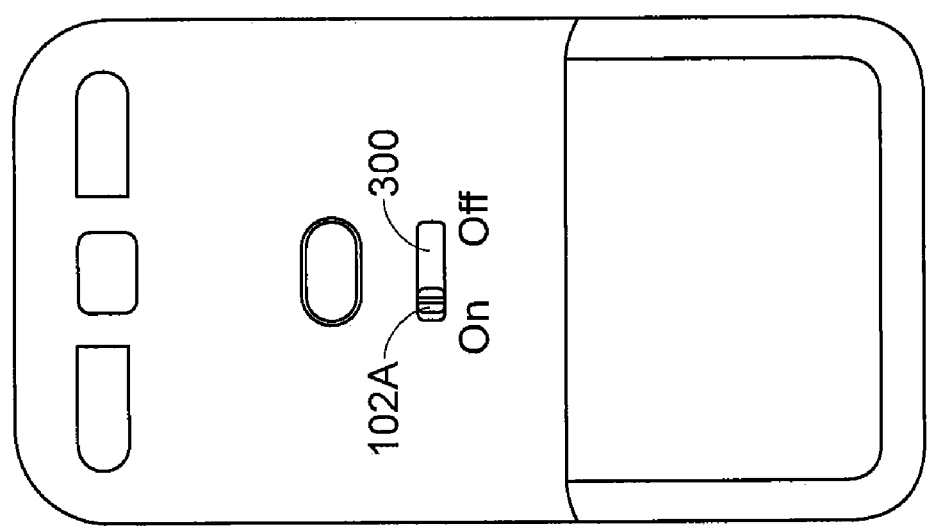
FIG. 3A is a schematic view illustrating the knob adjusted to an "ON" position.

Referring to FIGS. 3A and 3B, schematic views of manually adjusting the power switch are illustrated. As shown in FIGS. 3A and 3B, the housing 100 has an elongated channel 300. The knob 102A of the carrier seat 102 is movable along the channel 300. By adjusting the knob 102A to an "ON" position, the power switch 101 is triggered so that the user can operate the wireless mouse. Whereas, when the knob 102A is adjusted to an "OFF" position, the power switch 101 is not triggered and the wireless mouse 10 is powered off. In a case that the wireless signal receiver 200 is not received within the housing 100 of the wireless mouse 10, the carrier seat 102 inside the housing 100 may be moved to either the first position or the second position by stirring the knob 102A. As a consequence, the triggering part 101A of the power switch 101 is selectively triggered or not triggered by the carrier seat 102. For example, as shown in FIG. 3A, when the knob 102A is adjusted to the "ON" position, the carrier seat 102 is not in contact with the triggering part 101A of the power switch 101. Under this circumstance, the power switch 101 is turned on and the wireless mouse 10 is operated in the power-on state, as is also shown in FIG. 2. In contrast, as shown in FIG. 3B, when the knob 102A is adjusted to the "OFF" position, the carrier seat 102 is moved to the first position and sustained against the triggering part 101a of the power switch 101. Under this circumstance, the power switch 101 is turned off and the power supply of the wireless mouse 10 is interrupted, as is also shown in FIG. 1. Likewise, when the knob 102A is adjusted to the "ON" position, the carrier seat 102 is moved to the second position without contacting with the triggering part 101A of the power switch 101. Meanwhile, the wireless mouse 10 is operated in the power-on state again.

From the above description, when the wireless signal receiver 200 is completely stored within the housing 100 of the wireless mouse 10, the carrier seat 102 is transmitted to move to the first position such that the power supply of the wireless mouse 10 is interrupted. Moreover, when the wireless signal receiver 200 is not received within the housing 100 of the wireless mouse 10, the carrier seat 102 is selectively transmitted to move to the second position or the first position by adjusting the knob 102A exposed outside the housing 100 to an "ON" position or an "OFF" position. In addition, even if the wireless mouse needs to be temporarily powered off, the wireless signal receiver needs to be detached from the connecting port of the computer by simply adjusting the knob 102A to the "OFF" position. As a consequence, the power-saving means of the present wireless mouse is both user-friendly and convenient.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mouse comprising:
   a housing;
   a wireless signal receiver;
   a power switch arranged inside said housing and including a triggering part;
   a carrier seat slidably movable in a single plane of movement inside said housing for carrying said wireless signal receiver thereon and having a knob exposed outside a surface of said housing; and
   a push-push element arranged inside said housing and including a clipping part for engaging with said carrier seat to fix said carrier seat in a first position or a second position, wherein said carrier seat contacts said triggering part of said power switch to turn off said power switch when said carrier seat is fixed in said first position, wherein said carrier seat is selectively slidable to said first position or said second position by adjusting said knob to an on position or an off position when said wireless signal receiver is not received within said housing.

2. The wireless mouse according to claim 1 wherein said clipping part of said push-push element has a recess structure therein.

3. The wireless mouse according to claim 2 wherein said carrier seat further comprises an engaging plate to be inserted into said recess structure of said clipping part.

4. The wireless mouse according to claim 3 wherein said knob and said engaging plate of said carrier seat are integrally formed.

5. The wireless mouse according to claim 1 wherein said housing further comprises an elongated channel and said knob is movable along said elongated channel.

* * * * *